(12) United States Patent
Murphy et al.

(10) Patent No.: US 7,155,100 B2
(45) Date of Patent: Dec. 26, 2006

(54) FLAME-RETARDANT OPTICAL FIBER COATING COMPOSITION

(75) Inventors: Edward J. Murphy, Arlington Heights, IL (US); Nancy L. Coster, Hobart, IN (US); Keri Lynn Unterzuber, Hoffman Estates, IL (US); Christopher Todd Baker, Palatine, IL (US)

(73) Assignee: DSM IP Assets B.V., Heerlen (NL)

( * ) Notice: Subject to any disclaimer, the term of this patent is extended or adjusted under 35 U.S.C. 154(b) by 300 days.

(21) Appl. No.: 10/291,132

(22) Filed: Nov. 7, 2002

(65) Prior Publication Data

US 2003/0133679 A1 Jul. 17, 2003

Related U.S. Application Data

(60) Provisional application No. 60/394,406, filed on Jul. 8, 2002, and provisional application No. 60/337,656, filed on Nov. 8, 2001.

(51) Int. Cl.
*G02B 6/02* (2006.01)

(52) U.S. Cl. .................. 385/128; 385/147; 528/398; 524/100

(58) Field of Classification Search ......... 385/100–106, 385/112–114, 128, 145–147, 141–144; 528/398; 524/100, 464, 115; 522/109, 111, 162, 170
See application file for complete search history.

(56) References Cited

U.S. PATENT DOCUMENTS

| 4,624,994 | A | * | 11/1986 | Ansel .......................... 525/440 |
| 4,682,851 | A | * | 7/1987 | Ansel .......................... 385/141 |
| 4,782,129 | A | * | 11/1988 | Moschovis et al. ........... 528/49 |
| 4,794,133 | A | * | 12/1988 | Moschovis et al. ........... 524/99 |
| 4,806,574 | A | * | 2/1989 | Krajewski et al. ............. 522/96 |
| 4,849,462 | A | * | 7/1989 | Bishop ......................... 522/97 |
| 5,219,896 | A | * | 6/1993 | Coady et al. ................. 522/96 |
| 5,336,563 | A | * | 8/1994 | Coady et al. ................ 428/375 |
| 5,456,984 | A |   | 10/1995 | Bishop et al. |
| 5,479,555 | A |   | 12/1995 | Rot et al. |
| 6,049,647 | A |   | 4/2000 | Register et al. |
| 6,114,036 | A |   | 9/2000 | Rinehart et al. |
| 6,167,178 | A | * | 12/2000 | Nave .......................... 385/103 |
| 6,208,790 | B1 |  | 3/2001 | Zopf et al. |
| 6,714,712 | B1 |  | 3/2004 | Bishop et al. |
| 6,850,681 | B1 | * | 2/2005 | Lepont et al. ............... 385/128 |
| 2003/0133679 | A1 | * | 7/2003 | Murphy et al. .............. 385/128 |
| 2004/0002559 | A1 | * | 1/2004 | Troutman et al. ............ 524/100 |
| 2004/0037527 | A1 | * | 2/2004 | Lepont et al. ............... 385/128 |
| 2004/0116651 | A1 | * | 6/2004 | Van Den Bergen ......... 528/398 |

FOREIGN PATENT DOCUMENTS

| CN | 1221763 | 7/1999 |
| DE | 3444500 A1 | 11/1985 |
| EP | 0024593 A2 | 11/1981 |
| EP | 0041677 B1 | 2/1983 |
| EP | 0145213 A2 | 6/1985 |
| EP | 0160379 A1 | 11/1985 |
| EP | 0166926 A2 | 1/1986 |
| EP | 0 254 275 A2 | 1/1988 |
| EP | 0 516 438 A1 | 12/1992 |
| EP | 0528470 A2 | 2/1993 |
| EP | 0530869 A1 | 3/1993 |
| EP | 0 544 343 A1 | 6/1993 |
| EP | 0 707 606 B1 | 10/1998 |
| EP | 1 109 045 A1 | 6/2001 |
| JP | 59226413 | 6/1985 |
| JP | 214083 | 9/1985 |
| JP | 62-73213 | 4/1987 |
| JP | 7-18204 | 1/1995 |
| JP | 11-72669 | 3/1999 |
| WO | WO 91/11489 | 8/1991 |
| WO | WO 95/02004 | 1/1995 |
| WO | WO 00/37403 A1 | 6/2000 |
| WO | WO 03/040051 A1 | 5/2003 |

OTHER PUBLICATIONS

Zapf, "Buffered Fibres Coated with UV–Materials or Thermo–Plastics? A Comparison," Believed to have been obtained at a Trade Show.
Zapf, "New Colour Shades for High Fibre Count Applications," Believed to have been obtained at a Trade Show.
Zapp, "Flame–retardent UV–curable coatings and ribbon matrix materials," *Wire Industry*, 69 (826), 574 (2002).

* cited by examiner

*Primary Examiner*—Akm Enayet Ullah
(74) *Attorney, Agent, or Firm*—Leydig Voit & Mayer, Ltd

(57) ABSTRACT

An optical fiber comprises a flame retardant tight-buffer coating. The tight-buffer coating has a limiting oxygen index of at least 20% and preferably has a durable tensile strength. Flame retardant, inner primary, outer primary, ink, ink base and single coatings and coating compositions as well as flame-retardant matrix materials are also provided.

28 Claims, No Drawings

FLAME-RETARDANT OPTICAL FIBER COATING COMPOSITION

CROSS-REFERENCE TO RELATED PATENT APPLICATIONS

This patent application claims the benefit of U.S. Provisional Patent Application No. 60/337,656, filed Nov. 8, 2001, U.S. Provisional Patent Application No. 60/394,406, filed Jul. 8, 2002.

BACKGROUND OF THE INVENTION

1. Field of the Invention

The present invention relates generally to flame retardant optical fiber coating compositions, and, more particularly, to flame retardant fiber optic coating compositions that are durable when cured. The invention also relates to an optical fiber coated flame retardant coating composition, and to methods of making such optical fiber. The invention further relates to tight-buffer flame retardant fiber optic coating compositions and to methods of making such optical fiber.

2. Description of Related Art

Optical glass fibers are frequently coated with two or more superposed radiation-curable coatings which together form a primary coating immediately after the glass fiber is produced by drawing in a furnace. The coating which directly contacts the optical glass fiber is called the "inner primary coating" and an overlaying coating is called the "outer primary coating." In older references, the inner primary coating was often called simply the "primary coating" and the outer primary coating was called a "secondary coating," but for reasons of clarity, that terminology has been abandoned by the industry in recent years. Inner primary coatings are softer than outer primary coatings.

Single-layered coatings ("single coatings") can also be used to coat optical fibers. Single coatings generally have properties (e.g., hardness) which are intermediate to the properties of the softer inner primary and harder outer primary coatings.

The relatively soft inner primary coating provides resistance to microbending which results in attenuation of the signal transmission capability of the coated optical fiber and is, therefore, undesirable. The harder outer primary coating provides resistance to handling forces such as those encountered when the coated fiber is ribboned and/or cabled.

Optical fiber coating compositions, whether they are inner primary coatings, outer primary coatings, or single coatings, generally comprise, before cure, a polyethylenically-unsaturated monomer or oligomer dissolved or dispersed in a liquid ethylenically-unsaturated medium and a photoinitiator. The coating composition is typically applied to the optical fiber in liquid form and then exposed to actinic radiation to effect cure.

Optical fiber comprising a waveguide, an inner primary coating and an outer primary (or secondary) coating typically has a diameter of approximately 250 µm. The inner primary coating typically has an applied thickness of 20–40 µm and the outer primary coating typically has an applied thickness of about 20–40 µm.

For the purpose of multi-channel transmission, optical fiber assemblies containing a plurality of coated optical fibers have been used. Examples of optical fiber assemblies include ribbon assemblies and cables. A typical ribbon assembly is made by bonding together a plurality of parallel oriented, individually coated optical fibers with a matrix material. The matrix material has the function of holding the individual optical fibers in alignment and protecting the fibers during handling and installation. Often, the fibers are arranged in "tape-like" ribbon structures, having a generally flat, strand-like structure containing generally from about 2 to 24 fibers. Depending upon the application, a plurality of ribbon assemblies can be combined into a cable which has from several up to about one thousand individually coated optical fibers. An example of a ribbon assembly is described in published European patent application No. 194891. A plurality of ribbon assemblies may be combined together in a cable, as disclosed, for example, in U.S. Pat. No. 4,906,067.

The term "ribbon assembly" includes not only the tape-like ribbon assembly described above, but optical fiber bundles as well. Optical fiber bundles can be, for example, a substantially circular array having at least one central fiber surrounded by a plurality of other optical fibers. Alternatively, the bundle may have other cross-sectional shapes such as square, trapezoid, and the like.

Coated optical fibers (or waveguides) whether glass, or, as has come into use more recently, plastic, for use in optical fiber assemblies are usually colored to facilitate identification of the individual coated optical fibers. Typically, optical fibers are coated with an outer colored layer, called an ink coating, or alternatively a colorant is added to the outer primary coating to impart the desired color.

The ink layer, if applied, typically has an applied thickness of about 4–8 µm. The optical fiber, coated with inner primary coating, outer primary coating, and ink layer typically has a diameter of about 260 µm.

Typically, the matrix material of a fiber optic ribbon assembly or cable is separated from the individual coated fibers in order to facilitate splicing two cables, or the connection of a fiber to an input or output. It is highly desirable that the matrix material can be removed from the coated fiber with little or no effect on the outer primary coating or colored ink coating of the fiber. Good removability of the matrix material not only preserves the readily visual identification of the color coded fiber, it also avoids harming the waveguide during the removal process.

It is well known in the art that optical fiber coated with well-known inner primary, outer primary and ink or colored coatings have a relatively small diameter that makes such fiber difficult to work with and not entirely satisfactory for handling purposes. It is known to bundle optical fiber in loose buffer tubes. Such tubes include optical fiber surrounded by a gel-type buffer layer which is surrounded by the tube material. In order to improve handleability, and to add to the protection of the optical fiber, it is known to "upjacket" the fiber with a tight buffer coating. Upjacketing of the optical fiber is typically carried out to increase the diameter of fiber of from about 250 µm to a diameter of from about 650 µm to 900 µm. Upjacketing is desirable for applications such as local area networks, in-home applications and in commercial establishments. Upjacketed fiber can be bundled without the need for additional gel filling or buffering in loose buffer tubes known in the art.

Because the optical adhesive and durability properties of the tight-buffer coating are not as rigid as those properties are for the inner primary, outer primary and ink compositions typically used to make optical fiber, thermoplastic materials such as polyvinyl chloride have been used heretofore as the tight-buffer coating. However, thermoplastic materials, such as polyvinyl chloride-based tight-buffer coatings are undesirable, particularly as the demand for tight-buffer coated optical fiber rises.

Equipment for applying thermoplastic buffer based coatings is expensive, thermoplastic materials are not suitable for short runs, and it is difficult to apply such coatings. Other drawbacks of thermoplastic coatings are that they must be heated during application, they must be extruded through relatively small dies, e.g., on the order of 250 μm to 900 μm, they must be cooled which can result in undesired stresses in the optical fiber and they are not adapted to be applied at the high line speeds at which optical fiber is made. In addition, such coatings are not readily strippable from the optical fiber. Further, polyvinyl chloride-based coatings tend to become opaque when flame retardants are added to them. The opaque coating makes it difficult or impossible to identify individual color-coded fiber and thus defeats the important purpose of providing colored fiber for differentiating the different fibers in a ribbon, bundle or cable.

Recently, the art has attempted to provide a UV light-curable tight-buffer coating. For example, U.S. Pat. No. 6,208,790 B1 describes such a coating, but this patent does not describe flame-retardant tight-buffer coatings, and it does not describe UV light-curable coatings which are flame retardant.

It would be advantageous in the art to provide a flame retardant tight-buffer coating composition suitable for upjacketing optical fiber that is curable by exposure to actinic, i.e., ultraviolet, radiation as well as such a coating that can be used on existing machinery and in existing processes well known to producers of optical fiber. Such machinery includes but is not limited to the machinery for applying ink to coated fiber and to ribbon-making machinery. Additionally, it would be desirable if the flame retardant tight-buffer coating is optically transparent and durable.

Thus, there remains a need for a UV-curable flame retardant material that is optically transparent and that is durable, and, in one particular aspect, for a tight-buffer material that is optically transparent and that is durable. The present invention provides a composition that has these and, optionally, other attributes as well.

SUMMARY OF THE INVENTION

The present invention provides an optical fiber which includes a flame retardant tight-buffer coating. The tight-buffer coating includes a flame retardant material, and has a limiting oxygen index of at least 20%. Preferably, the coating is also optically transparent and has a durable tensile strength, and in other more preferred embodiments, the tight-buffer coating is halogen-free or substantially halogen-free. As used herein, the term substantially halogen-free means that the amount of halogen in the coating composition is less than about 5 wt %, more preferably less than about 2 wt %, and most preferably less than about 1 wt %. Thus, it is contemplated that halogen can be included in the composition as an impurity, or even intentionally, as for example, through the use of halogen-containing flame retardants, coating additives such as anti-static agents, fluorinated surface active additives and the like, and pigments, as are well known, so long as the composition is substantially halogen-free as that term is used herein.

The present invention further provides a radiation-curable optical fiber tight-buffer coating composition. The composition includes, in the uncured state, at least one monomer or oligomer having a radiation-curable functional group and flame-retardant material, preferably a halogen-free flame-retardant material. The coating, when cured, is optically transparent, has a limiting oxygen index of at least 20%, and has a durable tensile strength.

In a more specific embodiment, the invention provides a radiation-curable optical fiber tight-buffer coating composition, which, in the uncured state, includes at least one monomer or oligomer having a radiation-curable functional group and flame-retardant material, preferably a halogen-free flame-retardant material wherein the composition, when cured, exhibits self-extinguishing behavior when exposed to a flame under conditions, for example, as specified in Underwriter's Laboratories procedure UL94, which is incorporated by reference herein. The flame retardant is desirably selected from the group consisting of alkyl phosphate esters, aryl phosphate esters, alkylaryl phosphate esters, alkylated polyaryl phosphate esters, alkylphosphonate esters, aryl phosphonate esters, alkylaryl phosphonate esters, alkylated polyphenyl phosphonate esters, pentafunctional melamine acrylate, cyclic diphosphonate esters and mixtures thereof. The coating of this embodiment, when cured, has a limiting oxygen index of at least 20%.

The present invention also provides a method for making a flame-retardant optical fiber comprising upjacketing an optical fiber with a tight-buffer coating composition, wherein said tight-buffer coating composition, when cured, is optically transparent, has a limiting oxygen index of at least 20%, and has a durable tensile strength. In preferred embodiments of the invention, the tight-buffer coating composition is halogen-free or substantially halogen-free.

The coating compositions of the present invention exhibit self-extinguishing behavior when exposed to a flame. Similarly, optical fibers coated with the coating composition exhibit exceptional flame retardancy. This self-extinguishing behavior or flame-retardant characteristic makes the tight-buffer coated optical fiber of the present invention particularly useful for indoor home and/or commercial use due to the increased safety afforded by the reduced flammability of the fiber. The coating composition of the present invention is useful as an up-jacketing coating.

Additionally, the present invention provides inner primary coating compositions, outer primary coating compositions, ink and ink base compositions, single coating compositions and matrix materials that are flame retardant. In preferred embodiments of the invention, these coating compositions are also halogen-free or substantially halogen-free. It will be understood by those skilled in the art that the ink composition can be an ink base which is subsequently colored with the desired colorant or combination of colorants. Single coatings are known in the art. They are typically characterized as a coating which contacts the glass or plastic waveguide. The inner primary, outer primary, ink base and single coatings, and matrix materials when cured, are also optically transparent and have a durable tensile strength.

The present invention also includes optical fiber coated with at least one of a flame retardant inner primary coating, a flame retardant outer primary coating, a flame retardant ink coating, a flame retardant single coating and a flame retardant matrix material. Desirably, such coatings as are not intentionally colored when applied to the fiber are optically transparent. Such coatings also have a durable tensile strength. In other embodiments, the tight-buffer coating composition and the tight-buffer coating on the optical fiber is substantially halogen-free.

DETAILED DESCRIPTION OF THE INVENTION

The present invention provides, in one embodiment, a flame-retardant optical fiber coated with a UV light-curable tight-buffer coating composition. The tight-buffer coating composition comprises a flame retardant, and, when cured is optically transparent, has a limiting oxygen index of at least 20% and has a durable tensile strength. The physical properties of the cured tight-buffer composition can be determined on the cured composition as applied to an optical fiber, or it can be determined by casting the tight-buffer composition in the form of a film having a thickness of approximately 10 mils. In a preferred embodiment of the invention, the tight-buffer coating composition and the tight-buffer coating on the optical fiber is free of halogen. In other embodiments, the tight-buffer coating composition and the tight-buffer coating on the optical fiber is substantially halogen-free.

The optical fiber of the present invention includes a conventional, optical fiber known in the art. Such optical fiber includes a glass or plastic core (or waveguide), a cladding on the waveguide, a primary coating on the cladding and a secondary coating on the primary coating. The secondary coating may be colored, as is known, to provide a way to identify different individual fiber. Alternatively, the optical fiber as described can include an "ink" layer (as is known) on the secondary coating. The ink layer can be colored, again as a way to identify individual fibers, or marked with other indicia for identification.

In accordance with the one embodiment of the present invention, conventional optical fiber is coated with the tight-buffer coating composition. The tight-buffer coating can be applied to a secondary coating or to an ink layer with equal facility. The coating includes a flame retardant which imparts flame retardant characteristics to the tight-buffer coated optical fiber. Preferably, the tight-buffer coating when cured is transparent. This allows the underlying identifying indicia on the ink layer or outer primary coating to be observed through the tight-buffer coat. Additionally, the tight-buffer coat is strippable from the next adjacent layer, for example, the outer primary, ink layer, or even the matrix layer so that the optical fiber can be accessed for splicing, connection to an input or an output device, or the like.

In accordance with another embodiment of the invention, a UV light-curable tight-buffer coating composition is provided. The tight-buffer coating composition contains one or more radiation-curable oligomers or monomers having at least one functional group capable of polymerization when exposed to actinic radiation. Suitable radiation-curable oligomers or monomers are now well known and within the skill of the art.

Commonly, the radiation-curable functionality used is ethylenic unsaturation, which can be polymerized through radical polymerization or cationic polymerization. Specific examples of suitable ethylenic unsaturation are groups containing acrylate, methacrylate, styrene, vinylether, vinyl ester, N-substituted acrylamide, N-vinyl amide, maleate esters, and fumarate esters. Preferably, the ethylenic unsaturation is provided by a group containing acrylate, methacrylate, N-vinyl or styrene functionality.

Another type of functionality generally used is provided by, for example, epoxy groups, or thiol-ene or amine-ene systems. Epoxy groups can be polymerized through cationic polymerization, whereas the thiol-ene and amine-ene systems are usually polymerized through radical polymerization. The epoxy groups can be, for example, homopolymerized. In the thiol-ene and amine-ene systems, for example, polymerization can occur between a group containing allylic unsaturation and a group containing a tertiary amine or thiol.

A mixture of mono-, di-, tri-, tetra-, and higher functionalized oligomers can be used to achieve the desired balance of properties, wherein the functionalization refers to the number of radiation-curable functional groups present in the oligomer.

The oligomers usually comprise a carbon-containing backbone structure to which the radiation-curable functional group(s) are bound. For example, the oligomer can be represented by the formula:

R—X—R; or

R-L-X-L-R where R is a radiation-curable functional group,

X is a carbon-containing polymeric backbone, an aromatic group containing moiety, or a combination thereof, and L is a linking group.

The size of the carbon-containing backbone is preferably selected to provide the desired molecular weight and the selection of the backbone can take into account the linking group L, if a linking group is included in the oligomer. The number average molecular weight of the oligomer is desirably of from about 200 to about 30,000, preferably of from about 500 to about 7,000, and most preferably of from about 1,000 to about 5,000.

Illustrative of suitable carbon-containing polymeric backbones include a polymeric backbone of a polyether, a polyolefin, a polyester, a polyamide, a polycarbonate, an alkyd or mixtures thereof. Further, by way of example, the carbon-containing backbone of the oligomer can comprise aromatic groups and ring-opened epoxy groups or alkoxy groups.

The aromatic groups can be derived, for example, from bisphenol units, such as bisphenol A. Suitable oligomers are well known to those skilled in the art. A preferred oligomer is a diglycidyl ether derivative of bisphenol A to which acrylate functional groups have been bound. A commercially available example of such an oligomer is CN-120 (Sartomer), an epoxydiacrylate which has a molecular weight of about 500, and when cured has a $T_g$ of about 65° C.

Examples of suitable linking groups include alkoxy or ring opened epoxy such as ethoxy, propoxy, butoxy, and repeat units thereof. L can also be a urethane or urea linking group.

Another example of a preferred oligomer is a trifunctional polyether or polyester having a molecular weight of about 500 to about 5000. A preferred example of a trifunctional oligomer is the commercially available polyurethane triacrylate, "Oligomer B," which has a molecular weight about 2000, and when cured a $T_g$ of about 42° C.

The UV light-curable tight-buffer compositions of the present invention preferably contain one or more reactive diluents which are used to adjust the viscosity of the composition and the properties of the cured coating. The reactive diluent can be a low viscosity monomer having at least one functional group capable of polymerization when exposed to actinic radiation. Usually, the viscosity of the low viscosity diluent monomer is from about 50 to about 500 centipoise at 25° C. Examples of suitable viscosities for the tight-buffer coating compositions range from about 500 to about 50,000 centipoise at 25° C. Preferred amounts of radiation-curable diluent monomer include from about 5 to about 20% by weight, more preferably, from about 8 to about 16% by weight, based on the total weight of the composition.

The functional group in the reactive diluent may be of the same nature as that used in the radiation-curable monomer or oligomer. Preferably, the functional group present in the reactive diluent is capable of copolymerizing with the radiation-curable functional group present on the radiation-curable monomer or oligomer. More preferably, the radiation-curable functional group forms free radicals during curing which can react with the free radicals generated on the surface of the surface treated optical fiber.

The reactive diluent can be a monomer or mixture of monomers having an acrylate functionality. The reactive diluent can be an aromatic or an aliphatic acrylate. Especially preferred reactive diluents are isodecylacrylate and 2-phenoxyethylacrylate.

In keeping with one embodiment of the invention, the tight-buffer coating and the tight-buffer coating composition further comprise a halogen-free flame retardant material. By halogen-free it is meant that the flame retardant does not contain halogen. Halogen-free flame retardants that have been found to be useful are flame retardant plasticizers and flame retardant acrylate oligomers. The composition can include one or more flame retardant plasticizers, it can include one or more flame retardant acrylate oligomers, or it can include combinations of one or more flame retardant plasticizers and one or more flame retardant acrylate oligomers. The flame retardant materials suitable for use in the tight-buffer coatings and compositions must be compatible with the oligomers and reactive diluents and, when the composition is cured, they should not interfere with the optical transparency of the cured coating.

Illustrative suitable flame-retardant plasticizers include polyaryl phosphate ester, such as triaryl phosphate ester and trixylyl phosphate ester, cyclic diphosphonate ester, and the like. Alkylated triphenyl phosphate esters such as isopropylated triphenyl phosphate ester is particularly preferred. An example of cyclic diphosphonate esters suitable for use in the present invention is a compound of the formula:

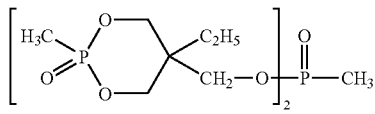

Other phosphates and phosphonates suitable for use in the invention include alkyl phosphate esters, aryl phosphate esters, alkylaryl phosphate esters, alkylated polyaryl phosphonate esters, such as alkylated polyphenyl phosphate esters, alkylphosphonate esters, aryl phosphonate esters, alkylaryl phosphonate esters, and alkylated polyaryl phosphonate esters, such as, alkylated polyphenyl phosphonate esters. Flame-retardant acrylate oligomers suitable for use in the invention include pentafunctional melamine acrylate. The flame retardants described herein are likewise suitable for the inner primary, outer primary, ink, including the ink base which may be colored subsequently, single and matrix material compositions described herein.

The following are, by way of illustration of and not in limitation of, flame retardants suitable for use in the coating compositions of the present invention: as alkyl phosphate esters, tributyl phosphate, tributoxy ethylphosphate; as aryl phosphate esters, triphenyl phosphate, trixylyl phosphate; as alkylaryl phosphate esters, 2-ethylhexyl diphenyl phosphate, isodecyl diphenyl phosphate, diethyl phenethylamidophosphate; as alkylated (poly)arylphosphate esters, isopropylated triphenyl phosphate, t-butyl triphenyl phosphate, tricresyl phosphate; as alkyl and alkylaryl phosphonate esters, dimethyl methylphosphonate, diethyl bis(hydroxyethyl) aminomethyl phosphonate, dimethyl phenylphosphonite, diethyl phenylphosphonite, diethyl (2-oxopropyl) phosphonate; and as cyclic esters and polyphosphorus compounds, cyclic diphosphonate methylester, pentaerythritol cyclic phosphate, bisphenol-A bis(diphenyl phosphate), and resorcinol bis(diphenyl phosphate).

The amount of flame-retardant material included in the tight-buffer coating composition is not narrowly critical, but there must be a sufficient amount to impart the desired flame retardancy to the tight-buffer coated optical fiber. Preferably, the flame retardant will be included in the composition in an amount sufficient to impart self-extinguishing characteristics to the cured coating. Generally, the amount of flame-retardant material included in the composition should be of from about 5% to about 50% by weight of the composition, more preferably of from about 15% to about 40% by weight of the composition. Similarly, these amounts of flame retardant used in the inner primary, outer primary, ink, ink base, single and matrix material compositions described hereinbelow is sufficient to impart self-extinguishing characteristics to the cured coating. Generally, the amount of flame retardant included in such compositions will be in the same ranges as the flame retardant is included in the tight-buffer coating.

It will be appreciated by those skilled in the art that the amount of flame-retardant in any of the tight-buffer, primary, secondary, ink, ink base, single, or matrix coating composition can vary depending on the type of flame-retardant used. Thus, the precise amount of flame-retardant to be used can be readily ascertained.

Tight-buffer coatings (and compositions when cured) have a limiting oxygen index (LOI) of at least 20%, preferably at least 21% and more preferably at least 22%. Tight-buffer coatings, when cured, with an even greater LOI are desirable. LOI of such coatings of at least 24%, at least 28%, at least 30% and even greater can be accomplished. The LOI of the coating is determined by ASTM D2863, which is incorporated by reference herein. The LOI can be accomplished with a tight-buffer coating that is halogen-free, or with a tight-buffer coating that is substantially halogen-free.

The tight-buffer composition and cured tight-buffer coating are optically transparent. By optically transparent it is meant that the coating composition when cured has an optical transparency of at least about 75% at a wavelength of 400–800 nm, and, more preferably, at least about 80% at a wavelength of 400–800 nm, most preferably at least about 85% at a wavelength of 400–800 nm. The optical transparency of the coating composition can be determined by casting and curing a film at typical UV-cure conditions of at least 0.5 j/sq. cm. of medium pressure mercury lamps with output between 200–400 μm., and subjecting the cured film to light at 400–800 nm and measuring the % transmittance of light through the film. The optical transparency of the tight-buffered coating on an optical fiber can be measured in a similar manner by removing the tight buffer, subjecting the removed portion of cured coating to light at 400–800 nm, and measuring the % transmittance of light through the film.

The tight-buffer composition and cured tight-buffer coating are durable, that is, they exhibit a limited reduction in tensile strength upon aging. The durability of the tight-buffer coating and of the composition can be determined on a film cast from the coating composition or on buffer coating specimens removed from an optical fiber coated with a tight-buffer. Durability is defined as a reduction in tensile strength of less than 20% after 100 hours exposure to an environment of 85° C. and 85% relative humidity (85/85 conditions). Preferably, the reduction in tensile strength is less than 10% after 100 hours of exposure to that environment. Buffer coatings which exhibit a reduction in tensile strength of less than 20% after 300 hours in the 85° C., 85% relative humidity environment are particularly preferred.

In yet another aspect, the present invention provides a method for upjacketing an optical fiber with a flame retardant tight-buffer coating. The method includes forming an optical fiber by, for example, conventional methods, applying the tight-buffer coating composition to the outermost layer of the optical fiber and curing the tight-buffer coating by subjecting the tight-buffer-coated fiber to ultraviolet light. Production of the upjacketed flame retardant using the tight-buffer coating of the present invention offers several advantages. It not only provides a flame-retardant optical fiber, but it also allows the coating composition to be cured in-line by exposure to ultraviolet light, curing can take place at high speed, such as, for example, the line speed at which the optical fiber itself is made, it avoids the use of expensive and cumbersome thermoplastic processing equipment, and it permits upjacketing without subjecting the optical fiber to stresses that could affect the light transmission of the fiber.

It will be appreciated by those skilled in the art that the present invention provides UV light-curable flame retardant optical fiber coating compositions such as inner primary coating compositions, outer primary coating compositions, ink and ink base compositions, single coating compositions and matrix materials. Optical fiber coated with such coatings are also provided by the present invention.

Examples of suitable radiation-curable compositions which may be used variously include those which are disclosed, for example, in U.S. Pat. Nos. 4,624,994, 4,682,851, 4,782,129, 4,794,133, 4,806,574, 4,849,462, 5,219,896 and 5,336,563, all of which are incorporated herein by reference.

Inner primary, outer primary, ink base, ink, single and matrix material radiation-curable compositions contain one or more radiation-curable oligomers or monomers having at least one functional group capable of polymerization when exposed to actinic radiation. Reactive diluents are also included in such compositions. Suitable radiation-curable oligomers or monomers and reactive diluents are now well known and within the skill of the art. Such compositions are well known to those skilled in the art.

Flame retardant coatings and optical fiber are provided by the inclusion of flame retardant material as described herein for the tight-buffer coating and fiber.

The limiting oxygen index of each of these coating compositions, when cured, is at least 20%, preferably at least 21%, and more preferably at least 22%. The LOI of the coating is determined by ASTM D2863. As with the tight-buffer coatings of the present invention, the LOI of inner primary, outer primary, ink (and ink base) single and matrix coatings, when cured, can readily exceed these preferred minimums. For example, LOI's of at least 24%, at least 28% and at least 30% and even higher can be achieved. The LOI can be accomplished with such coatings that are halogen-free or with such coatings that are substantially halogen-free.

The optical transparency and durable tensile strength of the inner primary, outer primary and ink base compositions, and of the matrix material composition is preferably the same as the optical transparency and durable tensile strength of the tight-buffer coating. Specifically, it is desirable that the optical transparency of such compositions is at least about 75%, more preferably at least about 80% and most preferably at least about 85%, all at a wavelength of 400–800 nm, based on the same test method that is described above for the tight-buffer coating. It will be appreciated by those skilled in the art, however, that the transparency of the composition and of the cured coating may be affected by the inclusion of colorants such as pigments and dyes. For example, the outer primary, ink base and single coatings, and the matrix materials can include colorants which impair the transparency of the colored coating. To determine transparency, therefore, it is desirable to measure the optical transparency of the uncolored coating composition or cured coating.

It is also desirable that the inner primary, outer primary, single coating ink base and ink compositions, and the matrix material composition be durable, based on the same test method that is described for the tight-buffer coating. Such coatings, when cured, should exhibit durability as determined by a reduction in tensile strength of less than 20% and preferably less than 10% after 100 hours exposure to an environment of 85° C. and 85% relative humidity (85/85 conditions), and even more preferably a reduction in tensile strength of less than 20% after 300 hours exposure to 85/85 conditions.

The following examples are illustrative of, but are not in limitation of, the present invention.

EXAMPLES 1–6

These Examples illustrate the preparation of flame-retardant optical fiber tight-buffer coating composition in accordance with the invention.

The epoxy diacrylates, acrylate ester, urethane acrylate, 2-phenoxyethyl acrylate and flame retardant materials were mixed in the indicated percentages by weight to form the coating composition, as shown in Table I. The tight-buffer coating was then formed as a thin film of approximately 10 mils and tested for various properties, as indicated in Table II.

TABLE I

|  | Ex. 1 | Ex. 2 | Ex. 3 | Ex. 4 | Ex. 5 | Ex. 6 |
|---|---|---|---|---|---|---|
| CN120Z epoxy diacrylate ester (a) | 45 | 40 | 50 | 59 | 44 | 46 |
| SR339A phenoxy acrylate ester (a) | — | 12 | 6 | 10 | 10 | — |
| SR395 isodecyl acrylate ester (a) | 19 | — | — | — | — | — |
| urethane acrylate oligomer (b) | — | 12 | — | — | — | 12 |
| 909-314 PEA | — | — | — | — | — | 8 |
| silicone additive (c) | 2 | 2 | 2 | 2 | 2 | — |
| photoinitiator (d) | 4 | 4 | 4 | 4 | 4 | — |
| Irgacure 1884 | — | — | — | — | — | 4 |
| NcendX P-30 phosphate additive (e) | 30 | — | — | — | — | — |
| Phosflex 31L phosphate additive (f) | — | 30 | 20 | — | — | 30 |
| Fyrolflex RDP phosphate additive (f) | — | — | 18 | — | — | — |
| Antiblaze 1045 phosphate additive (g) | — | — | — | 25 | 20 | — |
| Actilane 890 melamine acrylate (h) | — | — | — | — | 20 | — |
|  | 100 | 100 | 100 | 100 | 100 | 100 |

(a) Available from Sartomer Company Inc., Exton, PA.
(b) A proprietary urethane acrylate oligomer [CAS No. 3276-39-6] of polypropylene glycol Mw 2000, trimethylhexamethylene diisocyanate, and SR495 caprolactone acrylate also available from Sartomer Co., Inc.
(c) DC 193, available from Dow Corning Corp., Midland, MI.
(d) Darocure 1173, available from Ciba Specialty Chemicals Corp., Tarrytown, NY.
(e) Available from Albemarle Corp., Baton Rouge, LA. Proprietary aryl phosphate mixture [CAS No. 181028-79-5].
(f) These polyaryl phosphate plasticizers available from Akzo Nobel Chemicals Inc., Dobbs Ferry, NY, with CAS Nos. [68937-41-7] and [125997-21-9] respectively.
(g) This cyclic diphosphonate ester [CAS No. 42595-45-9] available from Rhodia Inc., Cranbury, NJ.
(h) Available from Akcros Chemicals America, New Brunswick, NJ.

The physical properties of the coatings, when cured, including the LOI, durability and optical transparency are set forth in Table II.

TABLE II

|  | Ex. 1 | Ex. 2 | Ex. 3 | Ex. 4 | Ex. 5 | Ex. 6 |
|---|---|---|---|---|---|---|
| Liquid viscosity: mPas @25° C. | 2250 | 1980 | 4890 | 11540 | 19990 | 7225 |
| Tensile strength: MPa @25° C. | 6 | 7 | 13 | 15 | 18 | 12 |
| Elongation: % at tensile failure | 31 | 26 | 8 | 8 | 6 | 22 |
| Secant modulus: MPa @75° C. | 35 | 53 | 320 | 387 | 529 | 170 |
| DMA max tan delta | 32° C. | 38° C. | 48° C. | 50° C. | 51° C. | 46° C. |
| DMAE' = 1000 MPa | +3° C. | −5° C. | 17° C. | 33° C. | 34° C. | +3° C. |
| DMAE' = 100 Mpa | 28° C. | 32° C. | 46° C. | 48° C. | 54° C. | +40° C. |
| LOI (ASTM D 2863) | 30% | 24% | 24% | 26% | 25% | 24% |
| Durability, tensile strength (MPa), 28 days 85/85 | >10 | >10 | 16 | 49 | 21 | >11 |
| Transparency, 250 μm film, 400–800 nm | >85% | >85% | >85% | >85% | >85% | 85% |

The Examples demonstrate the flame retardancy, optical transparency and durability of the tight-buffer coating of the present invention, Examples 1–5, and of a single coating or matrix material, Example 6. Optical fiber coated with the flame retardant tight-buffer coating will also exhibit desirable flame retardant characteristics.

While this invention has been described with emphasis upon preferred embodiments, it will be obvious to those of ordinary skill in the art that the preferred embodiments may be varied. It is intended that the invention may be practiced otherwise than as specifically described herein. Accordingly, this invention includes all modifications encompassed within the spirit and scope of the appended claims.

What is claimed is:

1. A radiation-curable optical fiber tight-buffer coating composition, comprising, in the uncured state, at least one monomer or oligomer having a radiation-curable functional group and a halogen-free flame-retardant material, wherein said coating, when cured, is optically transparent, has a limiting oxygen index of at least 20%, and has a durable tensile strength.

2. The tight-buffer coating composition of claim 1, wherein said flame-retardant material is selected from the group consisting of alkyl phosphate esters, aryl phosphate esters, alkylaryl phosphate esters, alkylated polyaryl phosphate esters, alkylphosphonate esters, aryl phosphonate esters, alkylaryl phosphonate esters, alkylated polyaryl phosphonate esters.

3. The tight-buffer coating composition of claim 1, wherein said flame-retardant material is selected from the group consisting of flame-retardant plasticizer, flame-retardant acrylate oligomer, cyclic diphosphonate ester and mixtures thereof.

4. The tight-buffer coating composition of claim 3, wherein said flame-retardant plasticizer is polyaryl phosphate ester.

5. The tight-buffer coating composition of claim 4, wherein said polyaryl phosphate ester is triaryl phosphate ester.

6. The tight-buffer coating composition of claim 4, wherein said polyaryl phosphate ester is alkylated triphenyl phosphate ester.

7. The tight-buffer coating composition of claim 4, wherein said polyaryl phosphate ester is isopropylated triphenyl phosphate ester.

8. The tight-buffer coating composition of claim 3, wherein said flame-retardant acrylate oligomer is pentafunctional melamine acrylate.

9. The tight-buffer coating composition of claim 3, wherein said flame-retardant is a cyclic diphosphonate ester.

10. The tight-buffer coating composition of claim 1, wherein said composition, when cured, has an optical transparency of at least 75% at a wavelength of 400–800 nm.

11. The tight-buffer coating composition of claim 1, wherein said composition, when cured, has an optical transparency of at least 80% at a wavelength of 400–800 nm.

12. The tight-buffer coating composition of claim 1, wherein said composition, when cured, has an optical transparency of at least 85% at a wavelength of 400–800 nm.

13. The tight-buffer coating composition of claim 1, wherein said composition, when cured, has a limiting oxygen index of at least 21%.

14. The tight-buffer coating composition of claim 1, wherein said composition, when cured, has a limiting oxygen index of at least 22%.

15. The tight-buffer coating composition of claim 1, wherein said flame-retardant is present in an amount of from about 20% to about 40% by weight of the composition.

16. A radiation-curable optical fiber tight-buffer coating composition, comprising, in the uncured state, at least one monomer or oligomer having a radiation-curable functional group and a flame-retardant material selected from the group consisting of alkyl phosphate esters, aryl phosphate esters, alkylaryl phosphate esters, alkylated polyaryl phosphate esters, alkylphosphonate esters, aryl phosphonate esters, alkylaryl phosphonate esters, alkylated polyaryl phosphonate esters, pentafunctional melamine acrylate, cyclic diphosphonate ester and mixtures thereof, said coating, when cured, having a limiting oxygen of at least 20%.

17. The tight-buffer coating composition of claim 16, wherein said flame-retardant material is isopropylated triphenyl phosphate ester.

18. The tight-buffer coating composition of claim 16, wherein said flame-retardant is pentafunctional melamine acrylate.

19. A radiation-curable optical fiber primary coating composition, comprising, in the uncured state, at least one monomer or oligomer having a radiation-curable functional group and a halogen-free flame-retardant material, wherein said coating, when cured, is optically transparent, has a limiting oxygen index of at least 20%, and has a durable tensile strength.

20. The primary coating composition of claim 19, wherein said flame-retardant material is selected from the group consisting of alkyl phosphate esters, aryl phosphate esters, alkylaryl phosphate esters, alkylated polyaryl phosphate esters, alkylphosphonate esters, aryl phosphonate esters, alkylaryl phosphonate esters, alkylated polyaryl phosphonate esters.

21. A radiation-curable optical fiber secondary coating composition, comprising, in the uncured state, at least one monomer or oligomer having a radiation-curable functional group and a halogen-free flame-retardant material, wherein said coating, when cured, is optically transparent, has a limiting oxygen index of at least 20%, and has a durable tensile strength.

22. The secondary coating composition of claim 21, wherein said flame-retardant material is selected from the group consisting of alkyl phosphate esters, aryl phosphate esters, alkylaryl phosphate esters, alkylated polyaryl phosphate esters, alkylphosphonate esters, aryl phosphonate esters, alkylaryl phosphate esters, alkylated polyaryl phosphonate esters.

23. A radiation-curable optical fiber ink base coating composition, comprising, in the uncured state, at least one monomer or oligomer having a radiation-curable functional group and a halogen-free flame-retardant material, wherein said coating, when cured, is optically transparent, has a limiting oxygen index of at least 20%, and has a durable tensile strength.

24. The ink base coating composition of claim 23, wherein said flame-retardant material is selected from the group consisting of alkyl phosphate esters, aryl phosphate esters, alkylaryl phosphate esters, alkylated polyaryl phosphate esters, alkylphosphonate esters, aryl phosphonate esters, alkylaryl phosphonate esters, alkylated polyaryl phosphonate esters.

25. A radiation-curable optical fiber matrix coating composition, comprising, in the uncured state, at least one monomer or oligomer having a radiation-curable functional group and a halogen-free flame-retardant material, wherein said coating, when cured, is optically transparent, has a limiting oxygen index of at least 20%, and has a durable tensile strength.

26. The matrix coating composition of claim 25, wherein said flame-retardant material is selected from the group consisting of alkyl phosphate esters, aryl phosphate esters, alkylaryl phosphate esters, alkylated polyaryl phosphate esters, alkylphosphonate esters, aryl phosphonate esters, alkylaryl phosphate esters, alkylated polyaryl phosphonate esters.

27. A radiation-curable optical fiber single coating composition, comprising, in the uncured state, at least one monomer or oligomer having a radiation-curable functional group and a halogen-free flame-retardant material, wherein said coating, when cured, is optically transparent, has a limiting oxygen index of at least 20%, and has a durable tensile strength.

28. The single coating composition of claim 27, wherein said flame-retardant material is selected from the group consisting of alkyl phosphate esters, aryl phosphate esters, alkylaryl phosphate esters, alkylated polyaryl phosphate esters, alkylphosphonate esters, aryl phosphonate esters, alkylaryl phosphonate esters, alkylated polyaryl phosphonate esters.

* * * * *